Feb. 27, 1968  W. R. BERWICK ET AL  3,370,762
DEVICES FOR DELIVERING MEASURED QUANTITIES OF LIQUID
Filed March 16, 1966
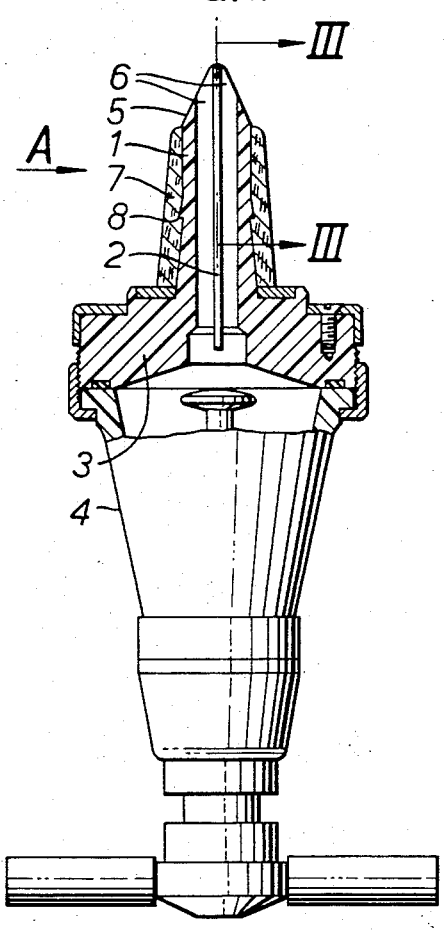
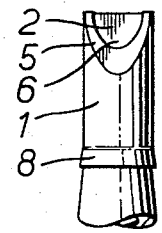
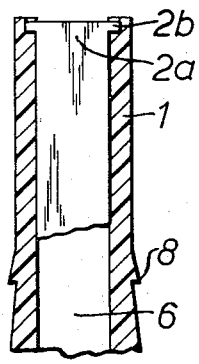
INVENTORS
WILLIAM RICHARD BERWICK
ALBERT GEORGE BERWICK
By: Norris + Bateman
Attys

United States Patent Office 3,370,762
Patented Feb. 27, 1968

3,370,762
DEVICES FOR DELIVERING MEASURED QUANTITIES OF LIQUID
William R. Berwick and Albert G. Berwick, Thornton Heath, Surrey, England, assignors to Gaskel & Chambers (Non-Drip Measure) Limited
Filed Mar. 16, 1966, Ser. No. 534,850
6 Claims. (Cl. 222—442)

ABSTRACT OF THE DISCLOSURE

A device for dispensing a measured quantity of liquid from an inverted bottle has an open inlet tube extending up from the measuring chamber to be thrust into the bottle mouth, and the inlet tube is internally divided into air and liquid conduits by a diametrically disposed separator plate extending substantially its length. The upper edges of the inlet tube are inclined downwardly and outwardly from a line containing the upper edge of the separator plate to provide enlarged tube end openings and inhibit the formation of air bubbles.

---

This invention relates to devices for delivering quantities of liquid from inverted bottles or similar containers and of the kind embodying a measuring chamber and an axially-movable operating member which, upon application of upward pressure thereto, closes off the measuring chamber from the container and delivers the contents of the chamber through a discharge outlet formed in the operating member. Examples of such devices are disclosed in our prior British patent specifications Nos. 532,530 and 862,166.

Such devices include at the upper end a tubular axial extension constituting an inlet tube by which liquid flows from the bottle into the measuring chamber, a cork or like means being mounted on the inlet tube for sealing the device within the mouth of the bottle. Usually the inlet tube is divided by a separator plate into two parallel conduits, this arrangement having been found to facilitate charging of the measuring chamber by separating the downward flow of liquid from the upward flow of air to replace liquid withdrawn from the bottle. Whilst these prior constructions generally operate fairly satisfactorily, there is at times a tendency for air bubbles to collect in or around the inlet tube and create an air lock which, by preventing complete filling of the measuring chamber, interferes with the accuracy of the measure. The present invention provides an improved inlet structure which overcomes this defect and ensures that the device operates to the close tolerances and with the consistent accuracy required for "Weights and Measures" sealed Government stamped measures.

According to the invention the upper end of the inlet tube is chamfered or angled off such as to enlarge the entrances to the air and liquid conduits.

Reference will now be made to the accompanying drawings which illustrate the manner in which the invention is carried into effect and wherein FIG. 1 is a part sectional side elevation of the device,
FIG. 2 is a fragmentary view of the upper end of the inlet tube as seen in the direction of the arrow A of FIG. 1, and
FIG. 3 is a cross sectional view of the tip of the inlet tube taken on the line III—III of FIG. 1.

Referring first to FIGS. 1 and 2, the inlet tube 1 with the separator plate 2 is moulded integrally with the roof member 3 of the measuring chamber 4 and at its upper end is angled off at opposite sides as shown at 5 to form a chisel-like tip with the straight edge coincident with the upper edge of the separator plate. Thus there is provided at each side of the separator plate an enlarged opening 6 of semi-elliptical shape leading into the air and liquid conduits respectively, this arrangement having been found to initiate smooth flow of air and liquid through the pipe without any air bubbles adhering thereto. The sealing cork 7 is bored to fit closely upon the inlet tube, said tube being preferably formed with one or more circumferential angled ribs 8 which ensure the grip of the cork on the tube, and eliminates the necessity for screw caps or other methods used to prevent the cork being removed when a bottle is being disconnected.

Alternatively and as shown in FIG. 3 the separator plate 2a may be fitted separately, the wall of the bore of the inlet tube being slotted at diametrically-opposed points to receive the side edges of the separator plate and locate it within the tube, said plate preferably having a slightly enlarged upper end 2b and the tube slots being correspondingly shaped to receive it for the purpose of firmly retaining the plate in position and preventing its falling out and also preventing the plate falling down or being pushed through the tube.

We claim:
1. A device for dispensing a measured quantity of liquid from an inverted bottle or the like comprising means defining a measuring chamber having a top opening from which an inlet tube projects upwardly to be thrust into the mouth of said bottle, a separator plate axially fixed within said tube and extending substantially between the open ends of said tube to provide for respective air and liquid conduits through the inlet tube, and means at the upper end of said inlet tube for providing smooth flow of air and liquid within the tube without forming air bubbles at said upper end of the inlet tube comprising downwardly and outwardly inclined tube upper end edges at opposite sides of said separator plate providing for each said conduit an end opening that is larger than the conduit cross-section within the tube.

2. A device as claimed in claim 1, wherein the inclined inlet tube edges form a chisel-like tip having a straight edge coincident with the upper edge of the separator plate.

3. A device as claimed in claim 1, wherein the inlet tube is formed externally with one or more circumferential angled ribs to ensure the grip of a retaining cork on said tube.

4. A device as claimed in claim 1, wherein the separator plate is moulded integrally with the inlet tube.

5. A device as claimed in claim 1, wherein the separator plate is received at its side edges in diametrically-opposed slots in the wall of the bore of the inlet tube, said plate having an enlarged upper end received in enlargements of the tube bore slot to retain the plate against axial displacement.

6. A device as defined in claim 1, wherein said inclined tube edges extend to intersect substantially at the upper end of said separator tube.

References Cited

UNITED STATES PATENTS

| 2,207,138 | 7/1940 | Weightman | 222—442 |
| 2,314,384 | 3/1943 | Berwick et al. | 222—442 |
| 2,507,840 | 5/1950 | Varga | 222—479 X |
| 3,131,831 | 5/1964 | Dorchak | 222—89 X |

M. HENSON WOOD, JR., *Primary Examiner.*
HADD S. LANE, *Examiner.*